United States Patent [19]

Heusch et al.

[11] Patent Number: 4,554,340
[45] Date of Patent: Nov. 19, 1985

[54] HOMOGENEOUS, STORAGE-STABLE POLYOL COMPOSITIONS OF HIGH ETHYLENE GLYCOL CONTENT AND THEIR USE FOR THE PRODUCTION OF POLYURETHANES

[75] Inventors: Rudolf Heusch, Leverkusen; Werner Rasshofer, Cologne; Wolfgang Reichmann, Hilden; Adolf Richartz, Cologne, all of Fed. Rep. of Germany

[73] Assignee: Bayer Aktiengesellschaft, Bayerwerk, Fed. Rep. of Germany

[21] Appl. No.: 703,059

[22] Filed: Feb. 19, 1985

Related U.S. Application Data

[62] Division of Ser. No. 497,626, May 24, 1983, Pat. No. 4,518,521.

[30] Foreign Application Priority Data

May 26, 1982 [DE] Fed. Rep. of Germany ....... 3219759

[51] Int. Cl.$^4$ ............................................. C08G 18/32
[52] U.S. Cl. ......................................... 528/77; 528/76
[58] Field of Search .................................... 528/76, 77

[56] References Cited

U.S. PATENT DOCUMENTS

| | | | |
|---|---|---|---|
| B 472,405 | 2/1976 | Barron . | |
| 3,865,762 | 2/1975 | Repiquet et al. | 521/160 |
| 3,945,393 | 3/1976 | Teatini | 137/220 |
| 4,029,493 | 6/1977 | Theissen | 71/105 |
| 4,125,505 | 11/1978 | Critchfield et al. | 260/332 |
| 4,141,852 | 2/1979 | Hogan et al. | 252/182 |
| 4,226,756 | 10/1980 | Critchfield et al. | 524/388 |
| 4,273,884 | 6/1981 | Dominguez | 521/114 |
| 4,351,753 | 9/1982 | Kaneko | 252/357 |

FOREIGN PATENT DOCUMENTS

| | | |
|---|---|---|
| 0069287 | 1/1983 | European Pat. Off. . |
| 1770703 | 11/1971 | Fed. Rep. of Germany . |
| 2309861 | 8/1974 | Fed. Rep. of Germany . |

Primary Examiner—John Kight
Assistant Examiner—Nathan M. Nutter
Attorney, Agent, or Firm—Gene Harsh; Joseph C. Gil

[57] ABSTRACT

A homogeneous, storage-stable, emulsifier-free polyol mixture having a high mixed OH-number and a high ethylene glycol content comprising 100 parts of a relatively high molecular weight polyalkylene oxide polyol having an OH-number of from 20 to 210, which contains at least 5%, and less than 80%, by weight, of terminal ethylene oxide blocks, from 0.1 to 30 parts of a low molecular weight diol mixture having an OH— number of 1200 to 1650 in the form of a reaction product of 1 mole of ethylene glycol with 0.1 to 0.5 moles of propylene oxide, optionally, up to 5 parts of di- and/or trifunctional compounds containing reactive hydrogen atoms and having a molecular weight of from 32 to 399, and optionally, other auxiliaries and additives known in the production of polyurethanes. Also, polyurethanes produced using these polyol mixtures.

4 Claims, No Drawings

HOMOGENEOUS, STORAGE-STABLE POLYOL COMPOSITIONS OF HIGH ETHYLENE GLYCOL CONTENT AND THEIR USE FOR THE PRODUCTION OF POLYURETHANES

This application is a division of application Ser. No. 497,626 filed May 24, 1983 now U.S. Pat. No. 4,518,521.

This invention relates to new, homogeneous, storage-stable, emulsifier-free polyol mixtures having high "mixed OH-numbers" (high OH-numbers of the mixture) and a high content of relatively high molecular weight polyoxyalkylene polyols having an OH-number of from 20 to 210 and containing at least 5% by weight of predominantly or exclusively terminal oxyethylene blocks, in admixture with reaction products of 1 mole ethylene glycol and from 0.1 to 0.5 mole of propylene oxide. The present invention also relates to the use of these polyol mixtures for the production of polyurethanes.

BACKGROUND OF THE INVENTION

It is known from German Auslegeschrift No. 1,770,703 that mixtures of incompatible polyols may be used for the production of polyurethanes. In this way, it is possible to obtain end products which have improved properties, such as, for example, higher thermal stability and higher impact strength. According to German Offenlegungsschrift No. 2,309,861, the use of incompatible polyol mixtures is also applicable to the production of foam moldings having compact surfaces.

However, the use of a mixture of incompatible polyols involves numerous disadvantages in material storage and processing. Even brief storage—from a few hours to three days—of thoroughly mixed polyol systems of the type in question causes the mixture to separate into two phases. This means that before processing or packaging, these polyol mixtures must be very intensively mixed or they must be continuously mixed or recirculated to ensure that the ratio between the components remains constant.

Various methods for imparting phase stability to mixtures of this type are known. According to U.S. Pat. No. 3,945,393, the phases may be stabilized by the addition of colloidal silica or a clay modified with an onium compound. German Offenlegungsschrift No. 2,341,294 teaches the use of inert surface-active materials, which have specific surface areas of from 10 to 800 $m^2/g$, such as silica agglomerate, a chrysotile asbestos and/or an inorganic material corresponding in its mineral structure to chrysotile asbestos. According to U.S. Pat. No. 4,141,852, mixtures of monomeric polyols having molecular weights below 500 and polyether polyols having molecular weights in the range from 1800 to 7000 are prevented from separating by the use of so-called "graft" polypropylene ether glycols which have molecular weights in the range of from 1500 to 3500. Similarly, U.S. Pat. No. 4,273,884 describes the production of a stable emulsion of a high molecular weight polyol and ethylene glycol or 1,4-butane diol by using an ethylene oxide/propylene oxide copolymer (molecular weight $\geq 12,000$).

German Auslegeschrift No. 2,759,398 describes mixtures of poly(oxy-propylene/oxyethylene) polyols (OH numbers of from 20 to 60) which have certain oxyethylene contents and ethylene glycol or butane diol. According to U.S. Published patent application No. B471,405, mixtures of high molecular weight polyoxyalkylene polyols having OH-equivalent weights of from 650 to 3000 and, for example, ethylene glycol are prevented from separating by the use of such compounds as 1,2-butylene glycol, di-(1,2-butylene glycol), di-(1,2-propylene glycol) and tri-(1,2-propylene glycol). In addition, it is known that two-phase mixtures of incompatible polyols may be homogenized by the addition of small quantities of emulsifiers, such as, for example, long-chain benzene alkyl sulfonates, etc. None of these prior art solutions is entirely satisfactory, however.

The use of solids as emulsion stabilizers can cause abrasion in mixing units, and indeed the stabilizing effect of these solids generally undergoes a radical deterioration after only a few days. Physiological objections have recently been put forward against asbestos-containing material. The inherent catalytic activity of some of these surface-active substances, particularly where they are modified with onium compounds, must be considered. The use of "graft polyols", as proposed in U.S. Pat. No. 4,141,852, involves a greater expense for these polyols and consequently reduces the economy of the process. Also, the emulsions produced in accordance with U.S. Pat. No. 4,273,884 undergo at least partial phase separation after only 6 to 8 weeks and the patent itself states that only "fairly stable" emulsions are obtained.

Although, as taught in U.S. Published patent application No. B471,405, the use of dipropylene and tripropylene glycol results in homogeneous, storage-stable mixtures from incompatible polyols, it is known that the use of these compounds results in a radical deterioration in the mechanicl properties of polyurethane plastics produced from them, particularly in regard to dimensional stability under heat. Emulsifiers which might be used are capable of gradual migration from the polyol mixture in crystalline form or, for example, of accumulation at the surface or of exuding from the finished polyurethane molding and drastically affecting its performance properties. They may also uncontrollably alter the catalytic balance of the system.

Accordingly, there is still an urgent technical need for polyol formulations which are stable in storage over a sufficiently long period (about 6 months, at least), which are optically clear, do not contain any other solids or liquid additions capable of migrating, otherwise separating, altering or reacting with one another, which have a high mixed OH-number, and which have a high ethylene glycol content.

It has now surprisingly been found that mixtures of polyols and ethylene glycol/propylene oxide reaction products may be produced which are homogeneous, storage-stable, optically clear and have a high content of ethylene glycol, without a simultaneously high content of (basically undesirable, above all higher) propoxylation products of ethylene glycol.

DESCRIPTION OF THE INVENTION

The present invention is directed to a homogeneous, storage-stable, emulsifier-free polyol mixture which has a high mixed OH-number and a high ethylene glycol content comprising
  (a) a relatively high molecular weight polyoxyalkylene polyol,
  (b) a mixture of low molecular weight diols, and, optionally,
  (c) other known compounds containing isocyanate-reactive hydrogen atoms and, (d) auxiliaries and additives of the type commonly used in the production of polyurethanes.

The mixture is particularly characterized in that component (a) is a polyoxyalkylene polyol having an OH-number of from 20 to 210 which contains at least 5% and less than 80%, by weight of terminal oxyethylene blocks, component (b) is a low molecular weight diol mixture having an OH-number of from 1200 to 1650 which has the form of a reaction product of 1 mole of ethylene glycol with from 0.1 to 0.5 moles of propylene oxide and, optional component (c) comprises difunctional and/or trifunctional compounds containing reactive hydrogen atoms and having molecular weights of from 32 to 399, such that for every 100 parts of component (a), the polyol mixture contains from 0.1 to 30 parts of component (b) and, optionally, up to 5 parts of component (c).

It is preferred to use polyol mixtures which contain, as component (a), polyoxyalkylene polyols having terminal oxyethylene oxide blocks in quantities of from 10 to 50%, by weight, and, more preferably, in quantities of from 12.5 to 27.5%, by weight. Preferred polyoxyalkylene polyols are dihydric to tetrahydric polyols having an OH-number of from 20 to 60.

The invention also relates to the use of these homogeneous, storage-stable, emulsifier-free polyol mixtures as a reaction component in the production of polyurethanes.

With respect to the prior art, these single-phase, storage-stable and emulsifier-free polyol mixtures according to the instant invention offer several significant advantages. In the production of integral-skin polyurethane foams, the non-cellular integral-skin is thicker, free from so-called pinholes and other surface defects, and the moldings using these foams show, overall, fewer "disruptions", i.e., irregular craters. Also, although cell stabilizers, for example, based on polysiloxane-polyalkylene oxide copolymers, are normally used, in the production of integral-skin foams, particularly in the case of rigid integral-skin foams, where polyol mixtures according to the instant invention are used, there is often little or no need to use stabilizers such as these. Then, since there is no need to use other agents, such as ionic or non-neutral emulsifiers, for establishing phase-homogeneity, it is possible to use additives which would otherwise potentially react with the other additives. Finally, providing a suitable procedure is adopted, it is also possible to produce so-called hot-formable integral-skin polyurethane foams.

It has surprisingly been found that it is only specific polyether polyols which, together with the ethylene glycol/propylene oxide adducts used in accordance with the invention, give a particularly high mixed OH-number for a relatively high ethylene glycol content and a relatively low content of alkoxylation products of ethylene glycol in the polyol mixture, coupled with phase homogeneity of the polyol mixture. These polyether polyols, used as component (a) are linear or branched di-, tri- tetra- or higher functional polyoxyalkylene polyols, preferably di-, tri- or tetra-functional, and particularly preferably di- or tri-functional polyoxypropylene polyols, which have an OH-number of from 20 to 210, preferably from 20 to 120 and, more preferably, from 20 to 60, which contain at least 5% and less than 80%, by weight, of polyethylene oxide blocks situated predominantly or exclusively at the chain ends. It is particularly preferred to use polyalkylene oxide polyols which contain from 10 to 50%, by weight, of terminal ethylene oxide blocks, based on the sum of all the alkylene oxide units present in the polyalkylene oxide polyol. Polyoxyalkylene polyols containing from 12.5 to 27.5%, by weight, of terminal ethylene oxide blocks are particularly preferred.

These relatively high molecular weight polyoxyalkylene polyether polyols containing predominantly-terminal oxyethylene oxide blocks (i.e., also containing predominantly-terminal primary OH-groups) are produced by the usual methods. Thus, these polyols are obtained by the polymerization of alkylene oxides, such as ethylene oxide, propylene oxide, 1,2- or 2,3-butylene oxide, tetrahydrofuran, styrene oxide and/or epichlorohydrin, by the addition of starter components containing reactive hydrogen atoms, such as water, polyols, ammonia or amines or polyamines or aminoalcohols. Such suitable starter components include ethylene glycol, 1,2- or 1,3-propane diol, dipropylene glycol, trimethylol propane, glycerol, pentaerythritol, sorbitol, sucrose, 4,4'-dihydroxy diphenyl propane, aniline, ethanolamine or ethylene diamine, and are optionally used in the presence of acid or, preferably, basic catalysts. The polymerization reaction is then carried out in admixture with ethylene oxide, but is preferably carried out in stages, with the addition of ethylene oxide in the final stage.

The production and properties of polyethers of the type in question are described, for example, in Ullmanns Enzyklopadie der Technischen Chemie, Verlag Chemie, Weinheim, 4th Edition, Vol. 19 (1981) in the chapter entitled "Polyoxyalkylene glycols" (pages 31 to 38) and in the chapter entitled "Polyurethanes" (pages 301 to 341, particularly pages 304 to 308), and are also reported in Kunststoff-Handbuch, Vol. VII, Polyurethane, Carl Hanser Verlag, Munich, 1966, pages 61 to 75.

The polyol component (b) is a mixture of the type obtained in a known manner by reacting ethylene glycol with propylene oxide. According to the invention, it is preferred to use from 0.1 to 0.5 mole, and preferably from 0.2 to 0.4 mole of propylene oxide to 1 mole of ethylene glycol. This component then has a composition consisting of (i) at least 40%, preferably at least 54%, by weight, of ethylene glycol, (ii) from 20 to 50%, preferably from 20 to 40%, by weight of monopropoxylated ethylene glycol, (iii) from 0 to 10%, preferably 0 to 5%, by weight, of dipropoxylated ethylene glycol, (iv) from 0 to 2%, preferably 0 to 1%, by weight, of more highly propoxylated ethylene glycol.

Propoxylation of the ethylene glycol may-be base catalyzed (for example, with alkali hydroxides) or acid-catalyzed (for example, with $BF_3$-etherate), although it is preferably catalyzed with KOH. On completion of the reaction, the catalyst is neutralized or absorbed and removed from the propoxylation product by known methods.

Optional starting component (c) are compounds containing at least two, preferably two or three isocyanate-reactive hydrogen atoms and having a molecular weight in the range of from 32 to 399. Suitable compounds may contain hydroxyl groups and/or amino groups and/or thiol groups and/or carboxyl groups, but preferably hydroxyl groups and/or aromatic amino groups, and may be used as chain-extending agents or cross-linking agents. They are only used in such quantities that the phase-homogeneity of the polyol mixture according to the invention always remains intact. Mixtures of different compounds containing at least two isocyanate-reactive hydrogen atoms and having a molecular weight in the range of from 32 to 399 may also, of course, be used.

Examples of compounds such as these include 1,2- and 1,3-propane diol, 1,4- and 2,3-butane diol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol, glycerol, trimethylol propane, 1,2,6-hexane triol, trimethylol ethane, pentaerythritol, quinitol, mannitol and sorbitol and castor oil. Di-, tri-, tetra- and higher polyethylene glycols having molecular weights of up to 39, di- tri-, tetra- and higher polypropylene glycols having molecular weights of up to 399, and di-, tri-, and higher polybutylene glycols having molecular weights of up to 399 may be used. Also, 4,4'-dihydroxy diphenyl propane, dihydroxymethyl hydroquinone, ethanolamine, diethanolamine, diisopropanolamine, N-methyl diethanolamine, triethanolamine and 3-aminopropanol, and dimethylol propionic acid are other suitable compounds. Then mixtures of hydroxy aldehydes and hydroxy ketones ("formose") and their reduced derivatives ("formitols") may also be used as the low molecular weight polyols. Dihydric and/or trihydric polyols are preferred with unbranched aliphatic diols containing up to 8 carbon atoms, such as 1,4-butane diol and/or 1,6-hexane diol, being particularly preferred.

Aromatic diamines of the type mentioned in German Offenlegungsschrift No. 2,854,384, for example 4,4'-diaminodiphenyl methane, are generally used as the polyamines. Relatively low-melting, relatively highly-soluble aromatic nucleus-alkylated diamines, such as nucleus-dialkylated tolylene-2,4- and -2,6-diamines, for example, 3,5-diethyl tolylene-2,4-diamine and/or 3,5-diethyl tolylene-2,6-diamine, 4-alkyl-3,5-diaminobenzoic acid isobutyl ester and di-, tri-, or tetra-$C_1$—$C_4$-alkyl diphenyl methane-4,4'-diamines, optionally with different alkyl substituents in the various nuclei, are preferred. Aliphatic diamines, for example, ethylene diamine and 1,6-hexane diamine, are less preferred, although they may be used in the form of their less-reactive aldimine or ketimine derivatives (see, U.S. Pat. No. 3,734,894/German Offenlegungsschrift No. 2,637,115).

Standard auxiliaries and additives for use as component (d) include known catalysts, for example, tertiary amines, such as dimethyl benzyl amine, 1,4-diazabicyclo (2,2,2)-octane or triethanolamine, monocyclic or bicyclic amidines, bis-dialkylaminoalkyl ethers or tertiary amines containing amide groups. It is also possible to use basic catalysts, such as alkali hydroxides, alkali phenolates or alkali alcoholates and organo metallic compounds, particularly organic lead and tin compounds, for example, dibutyl tin dilaurate, or mixtures thereof. However, it is also possible to use reaction retarders for the isocyanate reaction, for example, substances showing an acid reaction, such as hydrochloric acid or organic acid halides, boric acid or sulfur dioxide. Known foam cell regulators, such as paraffins or fatty alcohols, or even dimethyl polysiloxanes, blowing agents, as pigments and/or dyes, known flameproofing agents, stabilizers against the effects of light, ageing and weather, plasticizers and fungistatic and bacteriostatic substances may also be used. Further examples of additives such as these are described in Vieweg & Hoechtlen's Kunststoff-Handbuch, Vol. VII, pages 96 to 113, blowing agents for the production of polyurethane foams being described on pages 453 to 455, and on pages 507 to 510.

To produce polyurethanes, the polyol mixture according to the invention is used as the only reactant or one of several reactants which contains isocyanate-reactive groups and is mixed with polyisocyanates and, optionally, other auxiliaries and additives, such as blowing agents, cell regulators, catalysts, coloring substances, fillers and/or fibers. In addition to the polyol mixture according to the invention, it is possible to use, as the reactant containing isocyanate-reactive groups, other relatively high molecular weight polyols which have molecular weights of from 400 to 10,000 and preferably from 450 to 6,000. Such suitable polyols include known polyesters; polylactones; polycarbonates; polyethers; polythioethers; and polyacetals; preferably containing 2 or more active hydrogen atoms (mainly hydroxyl groups); vinyl polymers such as, for example, polybutadiene oils; polyhydroxyl compounds already containing urethane or urea groups; and natural polyols, or even other compounds containing Zerewitinoff-active groups, such as amino, carboxyl or thiol groups. These compounds are described, for example, in German Offenlegungsschriften Nos. 2,302,564; 2,423,764; 2,549,372 (U.S. Pat. No. 3,963,679); 2,402,799; 2,431,846; 2,402,840 (U.S. Pat. No. 3,984,607); and, in particular, German Offenlegungsschrift No. 2,854,384; and in German Auslegeschrift No. 2,457,387 (U.S. Pat. No. 4,035,213).

According to the invention, it is preferred to use hydroxyl-containing polyesters (for example, of glycols and adipic acid, phthalic acid, isophthalic acid and/or terephthalic acid and their hydrogenation products), hydroxy polycarbonates; polycaprolactones and polyethers containing, in particular, 2 to 8, and preferably 2 to 4, OH-groups (polyoxyalkylene polyols). Such compounds are produced by the polymerization of epoxides, such as ethylene oxide, propylene oxide, butylene oxide, tetrahydrofuran, styrene oxide or epichlorohydrin, on their own, for example, in the presence of Lewis catalysts, such as $BF_3$, or by the addition of these epoxides, preferably ethylene oxide and propylene oxide, optionally in admixture or successively, with starter components containing reactive hydrogen atoms, such as water, alcohols, for example, ethylene glycol, 1,3- or 1,2-propane diol, trimethylol propane, glycerol, sorbitol, 4,4'-dihydroxy diphenyl propane, ammonia, or amines, for example, aniline, ethanolamine or ethylene diamine. Sucrose polyethers and formitol- or formose-started polyethers may also be used for the purposes of the invention.

Polyhydroxyl compounds containing high molecular weight polyadducts or polycondensates or polymers in finely dispersed or dissolved form may also be used. Such polyhydroxyl compounds are obtained, for example, by carrying out polyaddition reactions (for example, reactions between polyisocyanates and aminofunctional compounds) or polycondensation reactions (for example, between formaldehyde and phenols and/or amines) in situ in the above-mentioned compounds containing hydroxyl groups (see, for example, German Offenlegungsschriften Nos. 2,324,134 and 2,639,254). However, it is also possible, in accordance with U.S. Pat. No. 3,869,413 to mix an aqueous polymer dispersion with a polyhydroxyl compound and subsequently to remove the water from the mixture. Further, polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093; 3,110,695 and German Auslegeschrift No. 1,152,536) or polycarbonate polyols are also suitable for use in the process according to the invention.

Representatives of these compounds according to the invention are described, for example, in High Polymers, Vol. XVI, "Polyurethanes, Chemistry and Technology", by Saunders-Frisch, Interscience Publishers, New York, London, Vol. I, 1962, pages 32–42 and pages 44–54, and Vol. II, 1964, pages, 5–6 and 198–199, and in Kunststoff-Handbuch, Vol. VII, for example, on pages 45 to 71, and also in Ullmanns Enzyklopaedie der Technischen Chemie, 4th Edition, Vol. 19, in the chapter entitled "Polyurethanes", pages 301 to 341, and in the chapter entitled "Polyalkylene glycols", pages 31 to 38. It is of course possible to use mixtures of the above-mentioned compounds containing at least two isocyanate-reactive hydrogen atoms and having a molecular weight of from 400 to 10,000, for example mixtures of polyethers and polyesters.

Suitable difunctional chain-extending agents and polyfunctional compounds (crosslinking agents) having molecular weights in the range from about 18 to 399 are compounds containing H-active groups, such as water, hydrazine, glycols, polyamines, dihydrazide compounds, amino alcohols, as described with respect to component (c) and as normally used for polyurethane syntheses. A detailed list of such suitable compounds can be found in German Offenlegungsschrift No. 2,854,384.

The polyisocyanates used may be any of the polyisocyanates normally used for the production of polyurethanes, for example, aliphatic, cycloaliphatic, araliphatic, aromatic and heterocyclic polyisocyanates. Diisocyanates, of the type described, for example, by W. Siefken in Justus Liebigs Annalen der Chemie, 562, pages 75 to 136, such as hexane-1,6-diisocyanate, 1-isocyanato-3,3,5-trimethyl-5-isocyanato-methyl cyclohexane, dicyclohexyl methane-2,4'- and/or -4,4'-diisocyanate, 1,3- and/or 1,4-cyclohexane diisocyanate, stereoisomers and mixtures thereof are preferred. Particularly suitable polyisocyanates include aromatic polyisocyanates, such as tolylene-2,4- and/or -2,6-diisocyanate (TDI), diphenyl methane-4,4'- and/or -2,4'- and/or -2,2'-diisocyanate (MDI), and also the technical polyphenyl polymethylene polyisocyanates of the type obtained by condensing aniline with formaldehyde, followed by phosgenation, as described for example, in British Patent Nos. 874,430 and 848,671 (MDI containing polynuclear polyisocyanates). Modified polyisocyanates obtained by the modification of TDI and MDI, for example, polyisocyanates modified with polyols via urethane groups, carbodiimide groups, isocyanurate groups, biuretized polyisocynates, allophanatized polyisocyanates or polyisocyanates containing uret dione groups, are examples of such suitable modified technical isocyanates. Suitable technical polyisocyanates are described in detail in German Offenlegungsschrift No. 2,854,384, in Kunststoff-Handbuch, and in Ullmanns Enzyklopadie, 4th Edition, Vol. 19, pages 303–304. The polyisocyanates may also be used in the form of NCO-prepolymers of the starting polyisocyanates and, for example, relatively high molecular weight polyols.

Unless desired auxiliaries and additives are present in adequate quantities and composition, they may be added either separately or in admixture with one of the reaction components. The auxiliaries and additives in question are, for example, the groups of catalysts and reaction retarders, blowing agents, solvents, cell regulators, emulsifiers, polysiloxanes, fillers, dyes, pigments, oxidation inhibitors, UV absorbers, light stabilizers, stabilizers against oxides of nitrogen, flameproofing agents, hydrolysis-inhibitors and, optionally, small quantities of monofunctional chain terminators.

The polyols according to the invention may be processed together with the other polyurethane-forming reactants by any of the known methods, for example, in multistage procedures (NCO-prepolymer formation, followed by reaction). Processing is generally carried out in suitable metering, mixing and/or discharge units and in molds of the type commonly used in the processing of polyurethanes (see, for example, Ullmanns Enzyklopadie der Technischen Chemie, 4th Edition, Vol. 19, in the chapter entitled "Polyurethanes", on pages 314 to 336).

It is possible to produce polyurethane elastomers in non-cellular form as thermoplastic elastomers, polyurethane rubber or cast elastomers; in cellular form, preferably with gross densities in the range of from 300 to more than 1000 kg/m$^3$, as soft and elastic, semiflexible, or hard and elastic foams, for example, in the form of block foams, molded foams, with gross densities in the range of, for example, from 20 to 400 kg/m$^3$, and with closed and/or open cells, depending on the application envisaged. The polyol mixtures according to the instant invention are particularly suitable for use in the production of moldings having a compact skin and a core which becomes increasingly cellular towards the interior of the molding (RIM process for the production of so-called integral-skin foams) and in the production of optionally-cellular polyurethane elastomers. These polyol mixtures may also be used for the production of substantially linear, soluble polyurethanes, for example, for coating compositions, elasthane filaments or lacquers, and also for the production of dispersions and generally as OH-reactive components.

The invention is further illustrated, but is not intended to be limited by the following examples in which all parts and percentages are by weight unless otherwise specified.

EXAMPLES

Polyether polyols used in the Examples:

Polyol A

A trifunctional, trimethylol propane-started polyether polyol of 78%, by weight, of propylene oxide and 22%, by weight, of terminal ethylene oxide groups; OH-number 27 (PO/EO-contents in %, by weight).

Polyol B

A trifunctional, trimethylol propane-started polyether triol of 86.5% of propylene oxide and 13.5% of terminal ethylene oxide groups; OH-number 35.

Polyol C (for comparison, from the prior art)

A trimethylol propane/propylene glycol-started polyether polyol of 100% of propylene oxide; functionality 2.91; OH-number 56.

Polyol D (for comparison, from prior art)

A trimethylol propane/propylene glycol (84:16)-started polyether polyol of 100% of propylene oxide; functionality 2.78; OH-number 42.

Polyol E

An ethylene diamine-started tetrafunctional polyoxypropylene polyether polyol having an OH-number of 60.

Polyol F

A trifunctional, trimethylol-propane-started polyether triol of 83% of propylene oxide and 17% of terminal ethylene oxide groups; OH-number 28.

Polyol G

A trifunctional, trimethylol-propane-started polyether triol of 87% of propylene oxide and 13% of terminal ethylene oxide groups; OH-number 28.

Polyol H (comparison, from the prior art)

A difunctional, polypropylene glycol ether having an OH-number of 56.

Polyol I

A difunctional, propylene-glycol-started polyether diol of 92.5% of propylene oxide and 7.5% of terminal ethylene oxide groups; OH-number 56.

Polyol K

A difunctional, propylene-glycol-started polyether diol of 80% of propylene oxide and 20% of terminal ethylene oxide groups; OH-number 56.

Polyol L (comparison, from the prior art)

A difunctional polyoxypropylene glycol having an OH-number of 28.

Polyol M

A difunctional, propylene-glycol-started polyether diol of 85% of propylene oxide and 15% of ethylene oxide (terminal); OH-number 28.

Polyol N

A difunctional, propylene-glycol-started polyether diol of 80% of propylene oxide and 20% of terminal ethylene oxide groups; OH-number 28. Ethylene glycol/propylene oxide adducts:
Adduct I: of ethylene glycol and propylene oxide (molar ratio 1:0.25).

7924 g of ethylene glycol (117.6 moles) were introduced, at room temperature, into an autoclave equipped with a heating and cooling system, a stirrer, an air displacement system (vacuum connection and nitrogen inlet) and with a unit for metering the alkylene oxide. The air present was removed by evacuating the reaction vessel twice and refilling it with nitrogen. After heating to 80° C., 90 g of a 50% aqueous potassium hydroxide solution were introduced. 1706 g (29.4 moles) of propylene oxide were then introduced gradually (over a period of 3 hours) under a pressure of from 0.4 to 0.6 bar and at a temperature of from 100° C. to 105° C. (EG/PO molar ratio=1:0.25), the reaction temperature then being kept in that range by cooling or heating. After the propylene oxide had been added, the reaction mixture was stirred for another 3 hours at 100° C. to 105° C. After the addition of 900 g of water, the alkaline polymer was neutralized with 219.5 g of 12.5% sulfuric acid. The water was distilled off in vacuo at 90° to 105° C., after which the adduct was filtered off from the salts deposited. A colorless product was obtained.

| Data: | OH-number (mg of KOH/g) | 1462 | (OH-number determined by reaction with phthalic acid anhydride). |
|---|---|---|---|
| | pH | 5.85 | (with 10% water added) |
| | Viscosity (mPa · s/25° C.) | 25.7 | |
| | Acid number (mg of KOH/g) | 0.04 | |
| | Water content (%) | 0.01 | |

Gas-chromatographic composition:
64.1% of ethylene glycol.
32.2% of monopropoxylation product of ethylene glycol.
3.7% of dipropoxylation product of ethylene glycol.
Adduct II: of 1 mole of ethylene glycol and 0.5 mole of propylene oxide (catalyzed with KOH and neutralized with sulfuric acid, otherwise using the same production process as for Adduct I).

| Data: | OH-number (mg of KOH/g) | 1230 | (phthalic acid anhydride method) |
|---|---|---|---|
| | Viscosity (mPa · s/25° C.) | 29.3 | |
| | pH | 5.5 | |
| | Acid number (mg of KOH/g) | 0.05 | |
| | Water content (%) | 0.02 | |

Gas-chromatographic composition:
44.0% of ethylene glycol.
46.0% of monopropoxylation product of ethylene glycol.
10.0% of dipropoxylation product.
(0.1% of tripropoxylation product).
Adduct III: of 1 mole of ethylene glycol and 0.75 mole of propylene oxide; otherwise the same process as for Adduct I (for comparison).

| Data: | OH-number (mg of KOH/g) | 1018 | (acetic acid-anhydride) |
|---|---|---|---|
| | pH | 5.3 | |
| | Viscosity (mPa · s/25° C.) | 35.8 | |
| | Acid number (mg of KOH/g) | 0.07 | |
| | Water content (%) | 0.06 | |

Gas-chromatographic composition:
27.1% of ethylene glycol.
50.0% of monopropoxylation product of ethylene glycol.
21.5% of dipropoxylation product.
1.4% of tripropoxylation product.
Adduct IV: of 1 mole of ethylene glycol and 1 mole of propylene oxide (for comparison)

| Data: | OH-number (mg of KOH/g) | 85.5 |
|---|---|---|
| | pH | 7.5 |
| | Viscosity (mPa · s/25° C.) | 46.6 |
| | Acid number (mg of KOH/g) | 0.06 |
| | Water (%) | 0.03 |

Gas-chromatographic composition:
16.0% of ethylene glycol.
46.3% of monopropoxylation product of ethylene glycol.
33.6% of dipropoxylation product.

4.1% of tri- and tetra-propoxylation product.

Note: Any reference in the following Examples to "adduct" applies to the mixture of ethylene glycol and its propoxylation products.

EXAMPLE 1

1.1 Storage-stable polyol mixture according to the invention—100 g of Polyol A are mixed, while stirring, with different quantities of Adduct I, followed by storage at room temperature. The results are set out in Table I.

TABLE 1

Phase stabilities of Polyol A/Adduct I Mixtures

| Polyol A (g) | Adduct I (g) | Ethylene glycol content[1] of Adduct I (g) | %, by weight, in mixture | Mixed OH-number [2] | Phases |
|---|---|---|---|---|---|
| 100 | 5 | 3.2 | 3.05 | 95 | 1 |
| 100 | 10 | 6.4 | 5.82 | 157 | 1 |
| 100 | 15 | 9.6 | 8.35 | 214 | 1 |
| 100 | 20 | 12.8 | 10.67 | 266 | 1 |
| 100 | 25 | 16.0 | 12.8 | 314 | 1 |
| 100 | 30 | 19.2 | 14.76 | 358 | 1 |
| 100 | 40 | 25.6 | 18.29 | 437 | 2 |
| 100 | 45 | 28.8 | 15.86 | 472 | 2 |
| 100 | 50 | 32 | 21.33 | 505 | 2 |
| 100 | 100 | 64 | 32.00 | 745 | 2 |

[1]ethylene glycol content of Adduct I in g and in % by weight in the polyol mixture.
[2]determined by calculation (OH-number in mg of KOH/g).
1.2 If the procedure of 1.1 is repeated with the modification that ethylene glycol is used instead of Adduct I, the results set out in Table 2 are obtained.
[3]The mixed OH-number is calculated from the diol (adduct)used and the polyol used. In general it is desired to have homogeneous, phase stable mixtures which show an ehtylene glycol content as high as possible and an mixed-OH-number(OH-number of the mixture) as high as possible.

TABLE 2

Phase stability of Polyol A/ethylene glycol mixtures (comparative tests)

| Polyol A (g) | Ethylene glycol (g) | (%, by weight) | Mixed OH-number[1] | Phases |
|---|---|---|---|---|
| 100 | — | — | 27· | 1 |
| 100 | 5 | 4.76 | 112 | 1 |
| 100 | 10 | 9.09 | 189 | 2 |
| 100 | 15 | 13.04 | 259 | 2 |
| 100 | 20 | 16.67 | 324 | 2 |
| 100 | 25 | 20.0 | 383 | 2 |
| 100 | 30 | 23.08 | 438 | 2 |
| 100 | 50 | 33.3 | 620 | 2 |
| 100 | 100 | 50.0 | 917 | 2 |

[1]determined by calculation
1.3 If the procedure of 1.1 is repeated with the modification that a mixture of ethylene glycol and 1,2-propane diol is used instead of Adduct I, the results set out in Table 3 are obtained.

TABLE 3

Phase stability of Polyol A/ethylene glycol & 1,2-propane diol mixtures (comparative tests)

| Polyol A (g) | Ethylene glycol (g) | 1,2-propane diol (g) | Mixed OH-number | EG[1] (%, by weight) | Phases |
|---|---|---|---|---|---|
| 100 | 6.67 | 6.67 | 198 | 5.9 | 1 |
| 100 | 6.67 | 13.33 | 287 | 5.55 | 1 |
| 100 | 6.67 | 26.67 | 409 | 5.00 | 1 |
| 100 | 6.67 | ≧40 | ≧508 | 4.55 | 2 |
| 100 | 13.3 | ≧6.67 | ≧305 | 11.08 | 2 |
| 100 | 20 | ≧6.67 | ≧384 | 15.79 | 2 |
| 100 | 26.67 | ≧6.67 | ≧455 | 20.05 | 2 |
| 100 | 33.33 | ≧6.67 | ≧519 | 23.81 | 2 |

TABLE 3-continued

Phase stability of Polyol A/ethylene glycol & 1,2-propane diol mixtures (comparative tests)

| Polyol A (g) | Ethylene glycol (g) | 1,2-propane diol (g) | Mixed OH-number | EG[1] (%, by weight) | Phases |
|---|---|---|---|---|---|
| 100 | 40 | ≧6.67 | ≧578 | 27.27 | 2 |

≧indicates that with this or an higher content of 1,2-propane diol or a higher OH-number of the mixture also two phases are observed.
[1]EG = ethylene glycol in the polyol mixture.
1.4 The ethylene glycol content of mixtures containing Adduct I (see Table 1) may be increased even further by the addition of free ethylene glycol. Thus, adducts of 100 g of Polyol A, 15 g of Adduct I and 1 g of ethylene glycol or of 100 g of Polyol A, 20 g of Adduct I and 1.5 g of ethylene glycol are also homogeneous and storage-stable, and show an even further increased mixed OH-number and ethylene glycol content. The ethylene glycol may even be replaced by the same quantity of 1,4-butane diol.

SUMMARY OF EXAMPLE 1

A mixture of Polyol A and ethylene glycol is only homogenous up to an ethylene glycol content of approximately 5%, by weight, which corresponds to a mixed OH-number of approximately 150 (see Table 2). If the ethylene glycol content is increased, phase separation occurs.

If the ethylene glycol is replaced by a propoxylation mixture containing approximately 64%, by weight, of ethylene glycol, of the type obtained by reacting ethylene glycol with propylene oxide (1:0.25) (Adduct I), a mixed OH-number of approximately 360 can be reached. This corresponds to approximately 15%, by weight, of free ethylene glycol in the polyol mixture (because approximately 64%, by weight, of Adduct I consists of ethylene glycol).

If an attempt is made to duplicate the required effect of combining as high an OH-number as possible and as high a free ethylene glycol content as possible with homogeneous miscibility by mixing different quantities of a mixture of ethylene glycol and 1,2-propane diol (with different ratios of ethylene glycol to 1,2-propane diol) with Polyol A (see Table 3), the mixed OH-number obtained is higher than that obtained by mixing with pure ethylene glycol; however, despite the comparable ethylene glycol content, it is not nearly as high as the mixed OH-number obtained where Adduct I is used. Similarly, the proportion of ethylene glycol which is homogeneously miscible with Polyol A is lower than where Adduct I is used in relation to the polyol and in relation to the total mixture. Moreover, a high 1,2-propane diol content is undesirable for use in the synthesis of polyurethanes. The object of the present invention is to provide for the polyurethane reaction a homogeneous polyol mixture having as high an OH-number as possible and as high an ethylene glycol content as possible for the lowest possible content of propoxylated ethylene glycol.

EXAMPLE 2

Storage-stable polyol mixture (for comparison) This Example shows that the results obtained with mixtures of 100 grams Polyol A and various quantities of an adduct obtained by propoxylating ethylene glycol with propylene oxide in a ratio of 1 mole of ethylene glycol to 1 mole of propylene oxide (Adduct IV) (see Table 4). The mixtures are then further diluted with various quantities of ethylene glycol (see Table 5). Neither set of results is as good (in terms of ethylene glycol content present) as those obtained where the propoxylation product of Example 1 is used.

TABLE 4

Phase stabilities of Polyol A/Adduct IV mixtures

| Polyol A (g) | Adduct IV[1] (g) | Mixed OH-Number | EG[2] (%, by weight) | Phases |
|---|---|---|---|---|
| 100 | 5 | 66 | 0.76 | 1 |
| 100 | 10 | 102 | 1.45 | 1 |
| 100 | 15 | 135 | 2.09 | 1 |
| 100 | 20 | 165 | 2.67 | 1 |
| 100 | 25 | 193 | 3.20 | 1 |
| 100 | 30 | 218 | 3.69 | 1 |
| 100 | 40 | 264 | 4.57 | 1 |
| 100 | 50 | 303 | 5.33 | 1 |
| 100 | 100 | 441 | 8.00 | 1 |
| 100 | 200 | 579 | 10.67 | 1 |

[1]OH-number 85.5
[2]ethylene glycol in the mixture, calculated from the EG-content of Adduct IV.

TABLE 5

Phase stabilities of Polyol A/ethylene glycol & Adduct IV mixtures (comparison)

| Polyol A (g) | Ethylene glycol (g) | Adduct IV (g) | Mixed OH-number | EG[3] (%, by weight) | Phases |
|---|---|---|---|---|---|
| 100 | 6.67 | 60 | 272 | 9.76 | 1 |
| 100 | 13.33 | 53.33 | 297 | 13.12 | 1 |
| 100 | 20 | 46.67 | 321 | 16.48 | 2 |
| 100 | 26.67 | 40 | 346 | 19.84 | 2 |
| 100 | 33.33 | 33.33 | 371 | 23.2 | 2 |
| 100 | 40 | 26.67 | 396 | 26.56 | 2 |
| 100 | 46.67 | 20 | 421 | 29.92 | 2 |
| 100 | 53.33 | 13.33 | 446 | 33.28 | 2 |
| 100 | 60 | 6.67 | 470 | 36.64 | 2 |
| 100 | — | 40 | 278 | 4.57 | 1 |
| 100 | 6.67 | 33.33 | 325 | 8.57 | 1 |
| 100 | 13.33 | 26.67 | 372 | 12.57 | 2 |
| 100 | 20 | 20 | 419 | 16.57 | 2 |
| 100 | 26.67 | 13.33 | 466 | 20.57 | 2 |
| 100 | 33.33 | 6.67 | 514 | 24.57 | 2 |

[3]total ethylene glycol content of the mixture (from the proportion in Adduct IV plus the quantity of EG added).

SUMMARY OF EXAMPLE 2

This Example shows that, although it is possible using Adduct IV to obtain considerably higher mixed OH-numbers of homogeneous, storage-stable mixtures, it is not possible to use ethylene glycol in the high quantity required. Thus, even where 100 parts of Adduct IV are used to 100 parts of Polyol A (see Table 4), the proportion of ethylene glycol at approximately 16 g is the same as would be used for the addition of 25 parts of Adduct I.

EXAMPLE 3

This Example demonstrates the effectiveness of Adducts I and II (according to the invention) and the result of adding Adducts III and IV (prior art) in the production of phase-stable polyol mixtures containing different polyols.

Table 6 shows (for comparison) the relative immiscibility of different quantities of ethylene glycol with polyether Polyols B to E.

Tables 7a–7d list the phase stabilities of the polyol mixtures of Adducts I to IV with Polyols B to E.

Table 8 shows the miscibility of Adduct IV with polyether Polyols B to E in the presence of different quantities of ethylene glycol.

In each case, the quantities indicated were combined with one another while stirring and the resulting mixtures visually observed for phase stability.

TABLE 6

Phase stabilities of various polyether/ethylene glycol mixtures (comparison tests)

| 100 g of polyether | Ethylene glycol | Mixed OH-number | EG (%, by weight) | Phases |
|---|---|---|---|---|
| Polyol B | 5 | 119 | 4.76 | 1 |
| Polyol B | ≧10 | ≧196 | ≧9.09 | 2 |
| Polyol C | ≧5 | ≧139 | ≧4.76 | 2 |
| Polyol D | 5 | 126 | ≧4.76 | 1 |
| Polyol D | ≧10 | ≧202 | ≧9.09 | 2 |
| Polyol E | ≧5 | ≧143 | ≧4.76 | 2 |

It can be seen from Table 6 that very little pure ethylene glycol may be homogeneously mixed with polyether Polyols B to E.

TABLE 7a

Phase stabilities of Polyols B to D in admixture with Adduct I

| 100 g of polyether | Adduct I (g) | Mixed OH-number | EG (%, by weight) | Phases |
|---|---|---|---|---|
| Polyol B[1] | 5 | 103 | 3.05 | 1 |
| Polyol B | 10 | 165 | 5.82 | 1 |
| Polyol B | 20 | 273 | 10.67 | 2 |
| Polyol B | 30 | 364 | 14.76 | 2 |
| Polyol C[2] | 5 | 123 | 3.05 | 1 |
| Polyol C | 10 | 184 | 5.82 | 2 |
| Polyol C | 20 | 290 | 10.67 | 2 |
| Polyol C | 30 | 380 | 14.76 | 2 |
| Polyol D[2] | 5 | 110 | 3.05 | 1 |
| Polyol D | 10 | 171 | 5.82 | 2 |
| Polyol D | 20 | 279 | 10.67 | 2 |
| Polyol D | 30 | 370 | 14.76 | 2 |

[1]polyether polyol according to the invention
[2]comparison polyether polyol

TABLE 7b

Phase stabilities of Polyols B to D in admixture with Adduct II

| 100 g of polyether | Adduct II (g) | Mixed OH-number | EG (%, by weight) | Phases |
|---|---|---|---|---|
| Polyol B | 5 | 90.5 | 2.09 | 1 |
| Polyol B | 10 | 140.9 | 3.99 | 1 |
| Polyol B | 20 | 229.2 | 7.32 | 1 |
| Polyol B | 30 | 303.8 | 10.13 | 1 |
| Polyol C | 5 | 110.5 | 2.09 | 1 |
| Polyol C | 10 | 160 | 3.99 | 1 |
| Polyol C | 20 | 246.7 | 7.33 | 1 |
| Polyol C | 30 | 320 | 10.13 | 2 |
| Polyol D | 5 | 97.1 | 2.09 | 1 |
| Polyol D | 10 | 147.3 | 3.99 | 1 |
| Polyol D | 20 | 235 | 7.33 | 2 |
| Polyol D | 30 | 309.2 | 10.13 | 2 |

TABLE 7c

Phase stabilities of Polyols B to D in admixture with Adduct III (for comparison)

| 100 g of polyether | Adduct III (g) | Mixed OH-number | EG (%, by weight) | Phases |
|---|---|---|---|---|
| Polyol B | 5 | 81.8 | 1.29 | 1 |
| Polyol B | 10 | 124.36 | 2.46 | 1 |
| Polyol B | 20 | 198.8 | 4.52 | 1 |
| Polyol B | 30 | 261.8 | 6.25 | 1 |
| Polyol C | 5 | 101.8 | 1.29 | 1 |
| Polyol C | 10 | 143.5 | 2.46 | 1 |
| Polyol C | 20 | 216 | 4.52 | 1 |
| Polyol C | 30 | 278 | 6.25 | 2 |
| Polyol D | 5 | 88.5 | 1.29 | 1 |
| Polyol D | 10 | 130.7 | 2.46 | 1 |
| Polyol D | 20 | 204.7 | 4.52 | 1 |
| Polyol D | 30 | 267.2 | 6.25 | 1 |

TABLE 7d

Phase stabilities of Polyols B to D in admixture with Adduct IV (For comparison)

| 100 g of polyol | Adduct IV (g) | Mixed OH-number | EG (%, by weight) | Phases |
|---|---|---|---|---|
| Polyol B | 5 | 74 | 0.76 | 1 |
| Polyol B | 10 | 110 | 1.45 | 1 |
| Polyol B | 20 | 172 | 2.67 | 1 |
| Polyol B | 30 | 224 | 3.69 | 1 |
| Polyol C | 5 | 94 | 0.76 | 1 |
| Polyol C | 10 | 128 | 1.45 | 1 |
| Polyol C | 20 | 189 | 2.67 | 1 |
| Polyol C | 30 | 240 | 3.69 | 1 |
| Polyol D | 5 | 81 | 0.76 | 1 |
| Polyol D | 10 | 116 | 1.45 | 1 |
| Polyol D | 20 | 178 | 2.67 | 1 |
| Polyol D | 30 | 230 | 3.69 | 1 |

TABLE 8

Phase stabilities of various Polyol/Adduct IV/ethylene glycol mixtures (for comparison)

| 100 g of polyether | Adduct IV + (g) | Ethylene glycol (g) | Total EG (%, by weight) | Mixed OH-number | Phases |
|---|---|---|---|---|---|
| Polyol B | 5 | 25 | 19.85 | 407 | 2 |
| Polyol B | 10 | 20 | 16.62 | 371 | 2 |
| Polyol B | 15 | 15 | 13.38 | 334 | 2 |
| Polyol B | 20 | 10 | 10.15 | 298 | 2 |
| Polyol B | 25 | 5 | 6.92 | 261 | 2 |
| Polyol C | 5 | 25 | 19.85 | 387 | 2 |
| Polyol C | 10 | 20 | 16.62 | 387 | 2 |
| Polyol C | 15 | 15 | 13.38 | 370 | 2 |
| Polyol C | 20 | 10 | 10.15 | 314 | 2 |
| Polyol C | 25 | 5 | 6.92 | 278 | 2 |
| Polyol D | 5 | 25 | 19.85 | 267 | 2 |
| Polyol D | 10 | 20 | 16.62 | 303 | 2 |
| Polyol D | 15 | 15 | 13.38 | 340 | 2 |
| Polyol D | 20 | 10 | 10.15 | 376 | 2 |
| Polyol D | 25 | 5 | 6.92 | 413 | 2 |
| Polyol E | 5 | 25 | 19.85 | 426 | 2 |
| Polyol E | 10 | 20 | 16.62 | 376 | 2 |
| Polyol E | 15 | 15 | 13.38 | 354 | 2 |
| Polyol E | 20 | 10 | 10.15 | 317 | 2 |
| Polyol E | 25 | 5 | 6.92 | 281 | 2 |

SUMMARY OF EXAMPLE 3

Tables 7a and 7b show that Adducts I and II according to the invention show better miscibility with Polyol B containing oxyethylene groups than known Polyols C and D, which are not according to the invention.

Comparison with Polyol A (Example 1), having the higher oxyethylene group content in the polyether, shows that this polyether is miscible with Adducts I and II in even higher proportions than is the case with Polyol B.

Although Adducts III and IV (for comparison) are also homogeneously miscible with Polyols B to E in virtually any ratios (see Tables 7c and 7d) the proportion of ethylene glycol is relatively low and the proportion of mono- and di-propoxylated ethylene glycol is too high for use in polyurethanes having favorable thermal properties.

Any increase in the total ethylene glycol content of the homogeneous binary mixtures of Polyols B to E and Adduct IV by the further addition of free ethylene glycol results in the formation of two-phase mixtures (see Table 8).

EXAMPLE 4

Example 4 investigates the extent to which the experience acquired with trifunctional polyether polyols in Examples 1 to 3 is applicable to linear polyethers.

Component Adducts I and II and Polyols H to N are intensively mixed with one another and visually observed for storage-stability.

The results are set out in Table 9.

TABLE 9

Storage-stability of mixtures of Polyols H to N with EG/PO - Adducts I to IV

| 100 g of polyol | EG/PO - adduct | Mixed OH-number | EG (%, by weight) | Phases |
|---|---|---|---|---|
| Polyol H[2] | 5 g Adduct I | 122.9 | 3.05 | 1 |
| Polyol H | 10 g " | 183.8 | 5.82 | 2 |
| Polyol H | 20 g " | 290.3 | 10.67 | 2 |
| Polyol H | 30 g " | 380.5 | 14.76 | 2 |
| Polyol I[1] | 5 g Adduct I | 122.9 | 3.05 | 1 |
| Polyol I | 10 g " | 183.8 | 5.82 | 1 |
| Polyol I | 30 g " | 380.5 | 14.76 | 2 |
| Polyol I | 20 g " | 290.3 | 10.67 | 2 |
| Polyol K[1] | 5 g Adduct I | 122.9 | 3.05 | 1 |
| Polyol K | 10 g " | 183.8 | 5.82 | 1 |
| Polyol K | 20 g " | 290.3 | 10.67 | 1 |
| Polyol K | 30 g " | 380.5 | 14.76 | 1 |
| Polyol L[2] | 5 g Adduct I | 96.3 | 3.05 | 1 |
| Polyol L | 10 g " | 158.4 | 5.82 | 2 |
| Polyol L | 20 g " | 267 | 10.67 | 2 |
| Polyol L | 30 g " | 358.9 | 14.76 | 2 |
| Polyol M[1] | 5 g Adduct I | 96.3 | 3.05 | 1 |
| Polyol M | 10 g " | 158.4 | 5.82 | 1 |
| Polyol M | 20 g " | 267 | 10.67 | 2 |
| Polyol M | 30 g " | 358.9 | 14.76 | 2 |
| Polyol N[1] | 5 g Adduct I | 96.3 | 3.05 | 1 |
| Polyol N | 10 g " | 158.4 | 5.82 | 1 |
| Polyol N | 20 g " | 267 | 10.67 | 1 |
| Polyol N | 30 g " | 358.9 | 14.76 | 2 |
| Polyol H[2] | 5 g Adduct II | 110.5 | 2.09 | 1 |
| Polyol H | 10 g " | 160 | 3.99 | 1 |
| Polyol H | 20 g " | 246.7 | 7.32 | 2 |
| Polyol H | 30 g " | 320 | 10.13 | 2 |
| Polyol I[1] | 5 g Adduct II | 110.5 | 2.09 | 1 |
| Polyol I | 10 g " | 160 | 3.99 | 1 |
| Polyol I | 20 g " | 246.7 | 7.32 | 1 |
| Polyol I | 30 g " | 320 | 10.13 | 2 |
| Polyol K[1] | 5 g Adduct II | 110.5 | 2.09 | 1 |
| Polyol K | 10 g " | 160 | 3.99 | 1 |
| Polyol K | 20 g " | 246.7 | 7.32 | 1 |
| Polyol K | 30 g " | 320 | 10.13 | 1 |
| Polyol L[2] | 5 g Adduct II | 83.8 | 2.09 | 1 |
| Polyol L | 10 g " | 134.5 | 3.99 | 1 |
| Polyol L | 20 g " | 223.3 | 7.32 | 2 |
| Polyol L | 30 g " | 298.5 | 10.13 | 2 |
| Polyol M[1] | 5 g Adduct II | 83.8 | 2.09 | 1 |
| Polyol M | 10 g " | 134.5 | 3.99 | 1 |
| Polyol M | 20 g " | 223.3 | 7.32 | 1 |
| Polyol M | 30 g " | 298.5 | 10.13 | 2 |
| Polyol N[1] | 5 g Adduct II | 83.3 | 2.09 | 1 |
| Polyol N | 10 g " | 134.5 | 3.99 | 1 |
| Polyol N | 20 g " | 223.3 | 7.32 | 1 |
| Polyol N | 30 g " | 298.5 | 10.13 | 1 |

[1] polyether according to the invention.
[2] comparison polyether.

SUMMARY OF EXAMPLES 1 TO 4

Examples 1 to 4 show that difunctional and trifunctional polyether polyols containing terminal polyoxyethylene blocks, in conjunction with the ethylene glycol/propylene oxide Adducts, I and II, according to the invention, give better homogeneous mixtures having relatively high ethylene glycol contents and high mixed OH-numbers. These examples show that the homogeneous miscibility distinctly increases with increasing content of polyoxyethylene blocks in the polyether despite the relatively high ethylene glycol content and the high mixed OH-number. Examples 1 to 4 particularly show that di- and tri-functional polyether polyols which have contents of terminal polyoxyethylene blocks of $\geq 12.5\%$ and, more specifically, of $\geq 20\%$, by weight, in conjunction with the ethylene glycol/propylene oxide, adducts, containing from 40 to 80%, and preferably from 54 to 80%, by weight, of ethylene glycol, according to the invention, produce phase-stable mixtures having particularly high contents of this ethylene glycol/propylene glycol adduct.

Examples 1 to 4 also show that phase-stable mixtures of these di- and tri-functional polyether polyols with the ethylene glycol/propylene oxide adducts used in accordance with the invention cannot be replaced by mixtures of ethylene glycol and 1,2-propane diol. Further, these examples show that it is more favorable for the same ethylene glycol content, to use an ethylene glycol/propylene oxide adduct having a higher ethylene glycol proportion rather than a lower ethylene glycol proportion, because the proportion of unwanted propoxylation products of ethylene glycol is particularly low with higher ethylene glycol proportion.

EXAMPLE 5

This example investigates the miscibility of Adducts I to IV in a polyether series with decreasing content of terminal oxyethylene sequences (see Table 10):

Polyol A 22% incorporation of terminal ethylene oxide groups.

Polyol F 17% incorporation of terminal ethylene oxide groups.

Polyol G 13% incorporation of terminal ethylene oxide groups.

TABLE 10

Phase stabilities of polyether/EG/PO - Adduct mixtures

| 100 g of polyether | EG/PO - Adduct (g) | %, by weight EG in the mixture | Mixed OH-number | Phases |
|---|---|---|---|---|
| Polyol A | 30 g Adduct I | 14.76 | 358.1 | 1 |
| Polyol A | 30 g Adduct II | 10.13 | 299.7 | 1 |
| Polyol A | 30 g Adduct III | 6.25 | 255.7 | 1 |
| Polyol A | 30 g Adduct IV | 3.69 | 218.1 | 1 |
| Polyol F | 20 g Adduct I | 9.32 | 267 | 1 |
| Polyol F | 25 g " | 12.8 | 314.8 | 1 |
| Polyol F | 30 g " | 14.76 | 358.9 | 2 |
| Polyol F | 30 g Adduct II | 10.13 | 298.4 | 1 |
| Polyol F | 30 g Adduct III | 6.25 | 256.4 | 1 |
| Polyol F | 30 g Adduct IV | 3.69 | 218.8 | 1 |
| Polyol G | 15 g Adduct I | 8.35 | 215 | 1 |
| Polyol G | 20 g " | 9.32 | 267 | 2 |
| Polyol G | 20 g Adduct II | 7.32 | 223.3 | 1 |
| Polyol G | 25 g " | 8.78 | 262.4 | 2 |
| Polyol G | 30 g Adduct IV | 3.69 | 218.8 | 1 |

SUMMARY OF EXAMPLE 5

Example 5 shows that Adduct I, which has the lowest degree of propoxylation, in conjunction with Polyol A, which has the highest terminal ethylene oxide content, gives mixtures having a higher content of free ethylene glycol than Adduct I in conjunction with Polyol F which has a lower content of terminal oxyethylene units, and even in conjunction with Polyol G which, in the series of Polyols A, F, G, has the lowest terminal oxyethylene group content.

Adduct II, which has a higher degree of propoxylation than Adduct I, shows similarly-graduated behavior.

Adducts III and IV, which do not correspond to the invention, may clearly be added to the polyethers in larger quantities than Adduct II and, more particularly, Adduct I, without phase separation occurring. As can be seen from Table 9, however, the proportion of ethylene glycol is undesirably low for the purposes of the invention, when compared with the proportion of ethylene glycol derivatives having a higher degree of propoxylation. These more highly propoxylated derivatives of ethylene glycol are undesirable because of the effect which they have on important properties of the polyurethanes.

EXAMPLE 6

Application Example—production of an integral-skin polyurethane foam.

| Formulation | |
|---|---|
| Polyol Component: | 70 parts of Polyol A |
| | x parts of adduct |
| | 3 parts of 3,5-diethyl-1-methyl-2,4- (and 2,6-)-diaminobenzene mixture (65:35). |
| | 0.3 parts of Dabco (TM) (tert.-amine catalyst, of the Air Products Company) |
| | 0.07 parts of UL-28 (a tin catalyst of the Witco Company/USA). |

Isocyanate A: a urethane-group- and carbodiimide-group-modified phosgenation product of an aniline/-formaldehyde condensate having an NCO content of 26.2%, by weight, and dichloromethane (isocyanate component=95.25 parts; dichloromethane=4.75 parts). Raw material temperatures: 25° C.; mold temperature: 50° C.

6.1 The polyol component produced using x=25 parts of Adduct I was processed by the RIM (reaction injection molding) method with 117.4 parts of Isocyanate A, on the basis of an index of 103.

6.2 The polyol component produced using x=30.5 parts of Adduct II was processed by the RIM-method with 117.4 parts of Isocyanate A, on the basis of an index of 103.

6.3 The polyol component produced using x=35.9 parts of Adduct III was processed by the RIM-method with 117.4 parts of Isocyanate A, on the basis of an index of 103 (comparison).

6.4 The polyol component produced using x=42.0 parts of Adduct IV was processed by the RIM-method with 117.4 parts of Isocyanate A, on the basis of an index of 103 (comparison).

Mechanical Data (as determined using a 20×20×0.4 cm thick mold plates)

| | 6.1 | 6.2 | 6.3 | 6.4 |
|---|---|---|---|---|
| | | | | (Comparison) |
| Unit weight | 1095 | 1105 | 1070 | 1100 |
| Shore D hardness | 65 | 64 | 63.5 | 63 |
| Sag test (mm sag at 121.1° C.) | 10 | 11.9 | 16 | 24 |

It can be seen that thermal stability, as determined by the sag test, deteriorates with an increasing number of oxypropylene units in the adducts.

Although the invention has been described in detail in the foregoing for the purpose of illustration, it is understood that such detail is solely for that purpose and that variations can be made therein by those skilled in the art without departing from the spirit and scope of the invention except as it may be limited by the claims.

What is claimed is:

1. A process for the production of polyurethanes comprising reacting isocyanates with a homogeneous, storage-stable, emulsifier-free polyol mixture having a high mixed OH-number and a high ethylene glycol content comprising 100 parts of a relatively high molecular weight polyalkylene oxide polyol having an OH-number of from 20 to 210, which contains at least 5%, and less than 80%, by weight of terminal ethylene oxide blocks and from 0.1 to 30 parts of a low molecular weight diol mixture having an OH-number of 1200 to 1650 in the form of a reaction product of 1 mole of ethylene glycol with 0.1 to 0.5 moles of propylene oxide.

2. A process according to claim 1, characterized in that the polyol mixture also comprises other di-, tri- or a combination of di- and tri- functional compounds containing isocyanate-reactive hydrogen atoms and having molecular weights of from 32 to 399.

3. A process according to claim 1 or 2, characterized in that other polyols containing isocyanate-reactive hydrogen atoms and having molecular weights of from 400 to 10,000 are also reacted with isocyanates for the production of polyurethanes.

4. A process according to claim 3, characterized in that other auxiliaries and additives known in the production of polyurethanes are contained in the polyol mixture, are added separately to the reaction mixture or are contained in the polyol mixture and are added separately to the reaction mixture.

* * * * *